(12) United States Patent
Kelley

(10) Patent No.: US 8,694,183 B1
(45) Date of Patent: Apr. 8, 2014

(54) PARTIAL AUTOMATED ALIGNMENT AND INTEGRATION SYSTEM

(75) Inventor: Gary Wayne Kelley, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 216 days.

(21) Appl. No.: 13/312,481

(22) Filed: Dec. 6, 2011

(51) Int. Cl.
*B64G 1/00* (2006.01)

(52) U.S. Cl.
USPC .......................................... 701/13; 244/158.1

(58) Field of Classification Search
USPC ......... 701/3, 13, 50, 124, 302, 408, 466, 467, 701/514, 516, 517, 518, 519, 23, 25; 472/130, 136; 434/29, 34, 219; 89/1.815; 244/158.1, 171.3, 171.1, 244/171.6, 173.1
See application file for complete search history.

(56) References Cited

U.S. PATENT DOCUMENTS

| | | | |
|---|---|---|---|
| 3,899,696 A * | 8/1975 | Fletcher et al. | 310/306 |
| 4,330,212 A * | 5/1982 | Miller | 356/508 |
| 4,796,198 A * | 1/1989 | Boultinghouse et al. | 701/23 |
| 4,846,297 A * | 7/1989 | Field et al. | 180/169 |
| 4,847,769 A * | 7/1989 | Reeve | 701/23 |
| 4,903,054 A * | 2/1990 | Wible | 250/559.06 |
| 5,111,401 A * | 5/1992 | Everett et al. | 701/24 |
| 5,280,431 A * | 1/1994 | Summerville et al. | 701/24 |
| 5,367,458 A * | 11/1994 | Roberts et al. | 701/25 |
| 5,434,781 A * | 7/1995 | Alofs et al. | 701/23 |
| 5,477,459 A * | 12/1995 | Clegg et al. | 701/300 |
| 5,548,512 A * | 8/1996 | Quraishi | 701/23 |
| 5,720,450 A * | 2/1998 | Kanne | 244/173.1 |
| 5,768,137 A | 6/1998 | Polidoro et al. | |
| 5,850,989 A * | 12/1998 | Trudeau et al. | 244/63 |
| 5,974,348 A * | 10/1999 | Rocks | 701/28 |
| 5,982,481 A | 11/1999 | Stone et al. | |
| 6,018,696 A * | 1/2000 | Matsuoka et al. | 701/524 |
| 6,064,940 A * | 5/2000 | Rodgers et al. | 701/408 |
| 6,330,866 B1 | 12/2001 | Cipolla | |
| 6,382,072 B1 | 5/2002 | Cipolla | |
| 6,556,942 B1 * | 4/2003 | Smith | 702/150 |
| 6,629,028 B2 * | 9/2003 | Paromtchik et al. | 701/23 |
| 6,674,687 B2 * | 1/2004 | Zeitzew | 367/6 |
| 6,779,252 B2 | 8/2004 | Tracy et al. | |
| 6,941,200 B2 * | 9/2005 | Sonoyama et al. | 701/23 |
| 7,084,987 B2 | 8/2006 | Kreuzer | |
| 7,142,981 B2 * | 11/2006 | Hablani | 701/472 |
| 7,222,726 B2 | 5/2007 | Meade | |
| 7,270,478 B2 | 9/2007 | Jimarez | |
| 7,334,947 B2 | 2/2008 | Rose et al. | |

(Continued)

OTHER PUBLICATIONS

NASA Podcasts, The Ground Umbilical Carrier Place, Created Nov. 5, 2010, last accessed at http://www.nasa.gov/multimedia/podcasting/gucp.html.*

*Primary Examiner* — John R Olszewski
*Assistant Examiner* — James M McPherson
(74) *Attorney, Agent, or Firm* — Absolute Technology Law Group, LLC; James J. McGroary

(57) ABSTRACT

The present invention is a Partial Automated Alignment and Integration System (PAAIS) used to automate the alignment and integration of space vehicle components. A PAAIS includes ground support apparatuses, a track assembly with a plurality of energy-emitting components and an energy-receiving component containing a plurality of energy-receiving surfaces. Communication components and processors allow communication and feedback through PAAIS.

20 Claims, 6 Drawing Sheets

(56) References Cited

U.S. PATENT DOCUMENTS

| | | |
|---|---|---|
| 7,343,231 B2 * | 3/2008 | Zoltan .............................. 701/23 |
| 7,400,291 B2 * | 7/2008 | Xu et al. ........................ 342/118 |
| 7,403,120 B2 * | 7/2008 | Duron et al. ................ 340/572.1 |
| 7,580,778 B2 * | 8/2009 | Krishnaswamy et al. ...... 701/13 |
| 7,706,917 B1 * | 4/2010 | Chiappetta et al. ........... 700/245 |
| 7,900,547 B2 | 3/2011 | Atmur et al. |
| 7,982,764 B2 * | 7/2011 | Kadaba ........................... 348/61 |
| 8,027,761 B1 * | 9/2011 | Nelson ............................. 701/23 |
| 8,046,160 B2 * | 10/2011 | Carter et al. ................... 701/498 |
| 8,295,955 B2 * | 10/2012 | DiBernardo et al. ........... 700/56 |
| 8,358,097 B2 * | 1/2013 | Cartwright .................... 318/652 |
| 8,478,442 B2 * | 7/2013 | Casey et al. .................. 700/245 |
| 2005/0021195 A1 * | 1/2005 | Zeitler et al. .................... 701/23 |
| 2010/0236391 A1 | 9/2010 | Baldi et al. |
| 2012/0179337 A1 * | 7/2012 | Doan ............................. 701/49 |

* cited by examiner

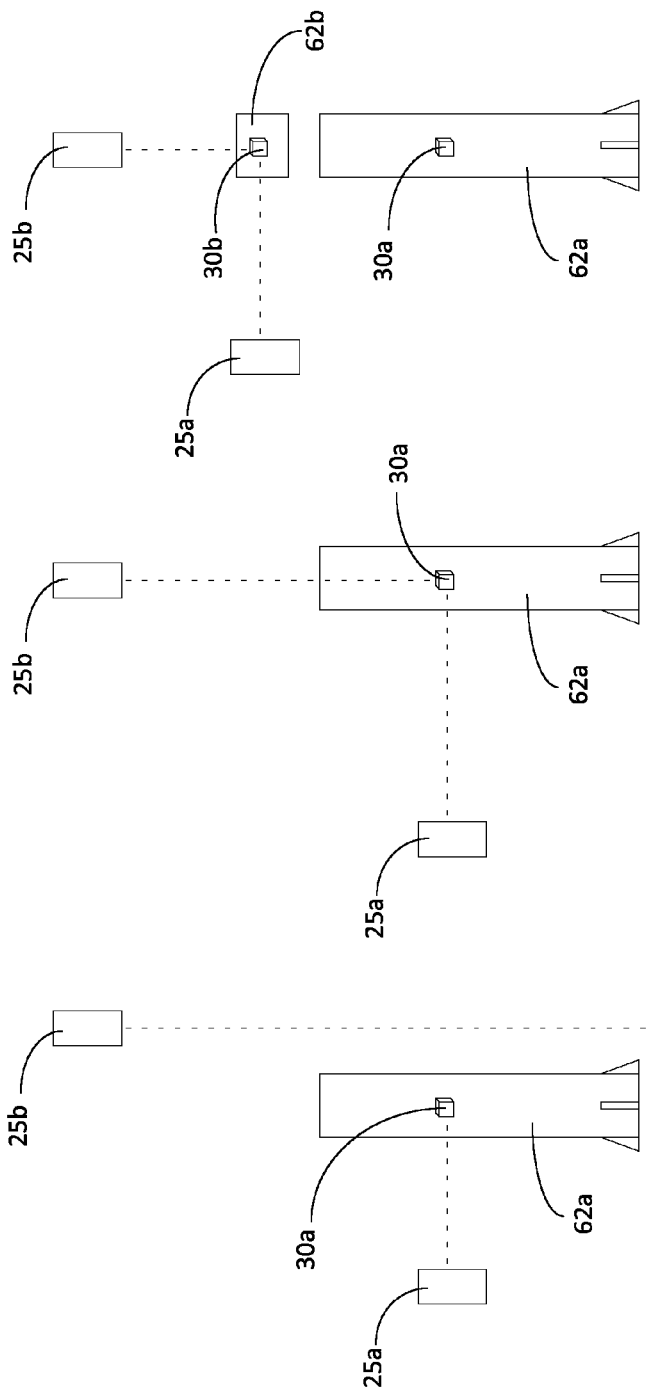

PARTIAL AUTOMATED ALIGNMENT AND INTEGRATION SYSTEM

FEDERAL RESEARCH STATEMENT

The invention described herein was made by an employee of the United States Government and may be manufactured and used by or for the Government of the United States of America for governmental purposes without the payment of any royalties thereon or therefore.

CROSS-REFERENCES TO RELATED APPLICATIONS

None.

FIELD OF INVENTION

The present invention relates to the assembly and integration of space and launch vehicles, and specifically to an automated assembly and integration system which provides electrical power to a space vehicle or space vehicle component.

TERMINOLOGY

As used herein, the term "horizontally movable equipment component" refers to any structure or device capable of moving a space vehicle component horizontally in an assembly area. Horizontally movable equipment components may be capable of moving a space vehicle component along an x axis, y axis or both.

As used herein, the term "electrical energy" means the flow of an electric charge.

As used herein, the term "energy-emitting component" refers to any device capable of emitting a form of energy to be received by an energy-receiving component. Energy-emitting components may be configured to emit any form of energy, including thermal energy, low-power laser energy, high-power laser energy, and any form of energy or combinations of energy known in the art.

As used herein, the term "energy-receiving component" refers to any device capable of engaging a space vehicle component and receiving energy. An energy-receiving component may be configured to convert received energy, such as thermal energy, into a form of usable energy, such as electrical energy.

As used herein, the term "energy-receiving surface" refers to a surface of an energy-receiving component specifically configured to receive energy. An energy-receiving component may contain any number of energy-receiving surfaces, and energy-receiving surfaces may be subdivided into sub-surfaces.

As used herein, the term "space vehicle component" refers to any hardware or structural component of a vehicle or other machinery adapted for use in space or to support a vehicle or other machinery which may be adapted for use in space.

As used herein, the term "thermal energy" refers to part of a system's total internal energy which results in the system's temperature. A laser may transmit thermal energy to a system, and systems may convert thermal energy into usable electrical energy.

As used herein, the term "track assembly" refers to energy-emitting components, the structures (e.g., transportation beams) to which energy-emitting components are movably attached, and any structures or devices facilitating the movement of the energy-emitting components.

As used herein, the term "vertically movable equipment component" refers to any structure or device capable of moving a space vehicle component vertically in an assembly area. Vertically movable equipment components may be capable of moving a space vehicle component along a z axis.

BACKGROUND OF THE INVENTION

In the present space industry, the process of assembling space vehicles requires very precise coordination of multiple ground support vehicles and types of mobile equipment. Ground support vehicles and other equipment must be precisely coordinated to assemble large parts with a high degree of precision to prevent failure.

Currently, large numbers of ground support personnel are needed to ensure precise alignment and functional integration of all equipment used in the assembly process.

Highly skilled crane operators are required to perform intricate maneuvers to align components. This process may be slow due to the complexity of manually positioning, rotating, and lowering the space vehicle elements and the testing of each segment of vehicle.

Once a component of a space vehicle is aligned and assembled with a second component, the assembly must be tested before additional components may be aligned and assembled. The assembly process is therefore time consuming, as the align, assemble, test sequence is repeated for each space vehicle component. Furthermore, whenever a test is unsuccessful, the components must be disengaged, realigned, reassembled and retested.

If a single part is misaligned, an entire mission schedule can be delayed as the vehicle is disassembled and reassembled to correct the error.

Currently, highly skilled personnel are required to precisely align and integrate space vehicles and control ground support equipment. Because of the sheer labor intensiveness of performing these alignments, design choices are limited. Designs are limited by the need to use components that can be integrated using a specific "family" of vehicles that can be predictably aligned (e.g., specific manufacturers' or compatible manufacturers' components).

It is desirable to allow NASA projects, managers and scientists the fullest possible range of design options, and that these design options not be limited by constraints of using launch vehicles from specific families.

It is desirable to reduce the number of personnel and time that must be dedicated to overseeing the alignment and integration process.

It is desirable to automate the alignment process and to reduce the error rate of the process.

SUMMARY OF THE INVENTION

The present invention is a Partial Automated Alignment and Integration System (PAAIS) used to automate the alignment and integration of space vehicle components. A PAAIS includes ground support apparatuses, a track assembly with a plurality of energy-emitting components and an energy-receiving component containing a plurality of energy-receiving surfaces. Communication components and software processors allow communication and feedback through PAAIS.

BRIEF DESCRIPTION OF THE DRAWINGS

FIGS. 5a, 5b and 5c illustrate an exemplary alignment technique using PAAIS.

DETAILED DESCRIPTION

Figure 1:
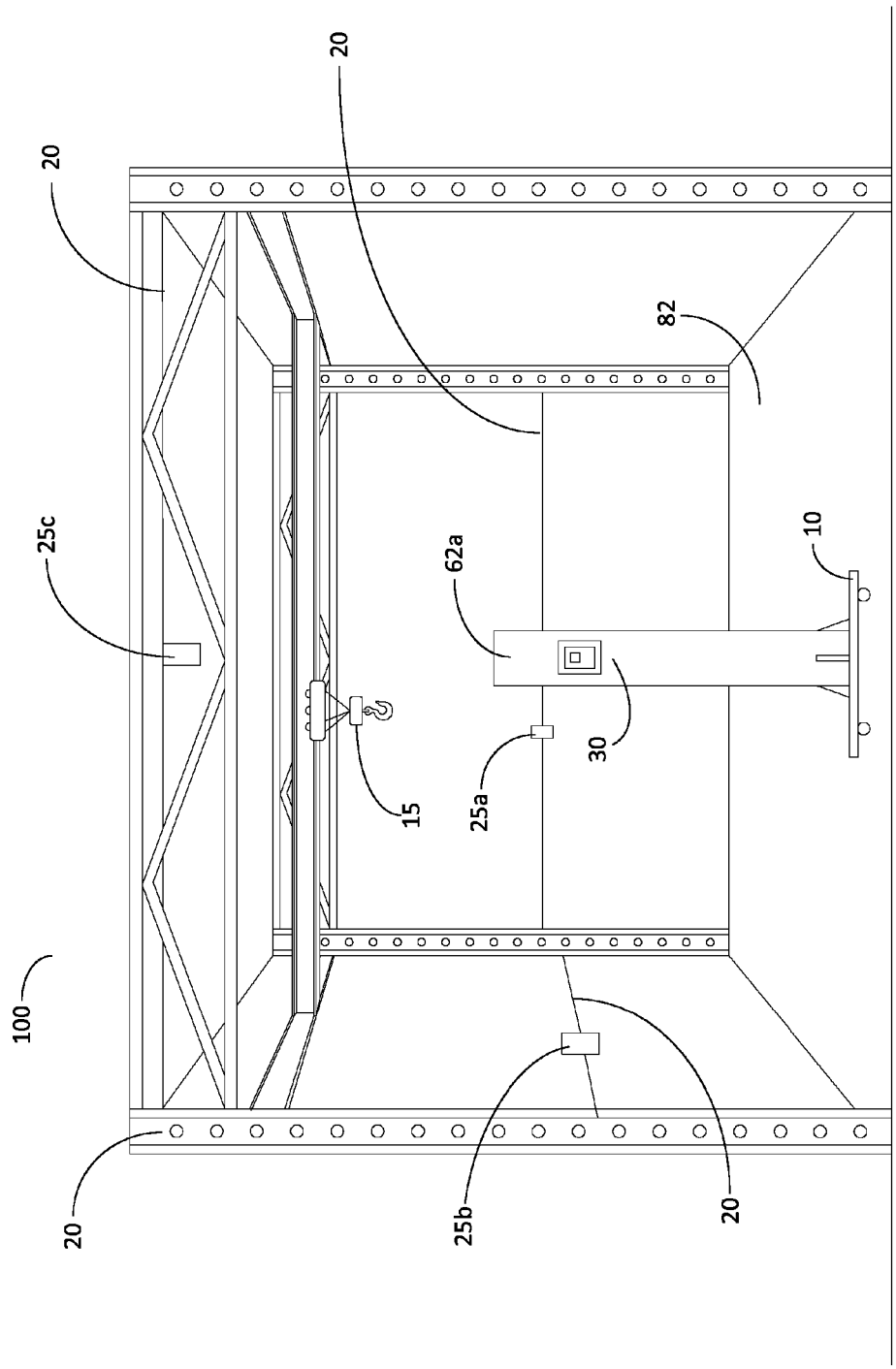
FIG. 1 is an exemplary embodiment of a partially automated alignment and integration system (PAAIS).

For the purpose of promoting an understanding of the present invention, references are made in the text to exemplary embodiments of a partial automated alignment and integration system, only some of which are described herein. It should be understood that no limitations on the scope of the invention are intended by describing these exemplary embodiments. One of ordinary skill in the art will readily appreciate that alternate but functionally equivalent materials, components, and steps may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary partial automated alignment and integration system (PAAIS) 100. In the exemplary embodiment shown, PAAIS 100 includes a first ground support apparatus 10 for moving space vehicle component 62a horizontally within assembly area 82 and a second ground support apparatus 15 for moving space vehicle component 62a vertically within assembly area 82. Assembly area 82 is the physical area defined by track assembly 20.

In the exemplary embodiment shown, first ground support apparatus 10 is a horizontally movable equipment component, such as a trolley, capable of moving space vehicle component 62a horizontally in any direction within assembly area 82, and second ground support apparatus 15 is a vertically movable equipment component, such as a crane, capable of moving space vehicle component 62a vertically in assembly area 82. In further exemplary embodiments, additional ground support apparatuses may be used, including, but not limited to, trailers, trolleys, hydraulic assemblies, cranes, suspension assemblies, dollies, rollers, and conveyor belts. In still further exemplary embodiments, any apparatus capable of moving space vehicle component 62a in assembly area 82 in any direction, including rotationally, may be used.

Space vehicle component 62a includes precision energy adapter (PEA) 30, which contains five precision energy receivers (PERs) 40 (not shown). In the exemplary embodiment shown, PEA 30 has a six-sided housing, with one side configured to engage space vehicle component 62a, and each of the remaining sides contain one PER 40 (not shown). In further exemplary embodiments, PEA 30 may contain between one and five PERs 40 (not shown). In still further exemplary embodiments, PEA 30 may be differently shaped to include additional sides capable of housing a PER 40 (not shown).

PERs 40 (not shown) are adapted to receive energy transmitted by precision energy emitters (PEEs) 25a, 25b, 25c on track assembly 20. PEEs 25a-25c are positionable on track system 20 and emit energy which is received by PERs 40 (not shown) when PERs 40 (not shown) are aligned with PEEs 25a-25c.

In the exemplary embodiment shown, track assembly 20 includes three PEEs 25a, 25b, 25c located throughout assembly area 82. PEE 25a is located at the rear of assembly area 82, PEE 25b is located at a side of assembly area 82 and PEE 25c is located at the top of assembly area 82. PEEs 25a, 25b, 25c therefore emit energy along the x, y and z axes, with the intersection point of the emitted energy corresponding to a predetermined position and orientation of space vehicle component 62a. PEEs 25a, 25b, 25c are specifically positioned within assembly area 82 so that energy from PEEs 25a, 25b, 25c is received by PERs 40 (not shown) only when space vehicle component 62a is specifically positioned at a predetermined position within assembly area 82.

For example, as space vehicle component 62a enters assembly area 82, PEE 25a emits energy which is received by PERs 40 (not shown) only when PEA 30 is vertically and horizontally aligned with PEE 25a. Similarly, energy emitted by PEE 25b is received by PERs 40 (not shown) only when PEA 30 is vertically and horizontally aligned with PEE 25b. Finally, energy emitted by PEE 25c is received by PERs 40 (not shown) only when PEA 30 is centered directly under PEE 25c. By using three PEEs 25a, 25b, 25c, PAAIS 100 is able to specifically orient space vehicle component 62a within assembly area 82.

While it is possible to use less than three PEEs, it is not preferred, as it would be difficult to accurately position a space vehicle component in a three dimensional space. In some exemplary embodiments, additional PEEs may be used to provide more accurate positioning.

As illustrated in FIG. 1, track assembly 20 is a system of transportation beams along which PEEs 25a, 25b, 25c may be positioned or moved. Transportation beams may be any structure known in the art to allow movement of PEEs 25a, 25b, 25c. In some exemplary embodiments, track assembly 20 may be configured to communicate with PAAIS 100 and devices which are able to automatically position PEEs 25a, 25b, 25c based on input into PAAIS 100.

In the exemplary embodiment shown, PEEs 25a, 25b, 25c are configured to emit both high-power laser and low-power laser energy. While space vehicle component 62a is being positioned within assembly area 82, before PERs 40 (not shown) are receiving energy, PEEs 25a, 25b, 25c emit low-power laser energy. Once PERs 40 (not shown) are receiving energy, PEEs 25a, 25b, 25c receive feedback from PEA 30 and begin emitting high-power laser energy for more accurate positioning. High-power laser energy may damage space vehicle component 62a, so it is desirable to use high-power laser energy only after it is known PERs 40 (not shown) are receiving the energy.

In the exemplary embodiment shown in FIG. 1, space vehicle component 62a is a stage of a rocket. In further exemplary embodiments, space vehicle component 62a may be any portion of a rocket, transport vehicle, or any other apparatus which may need to be assembled.

Figure 2:
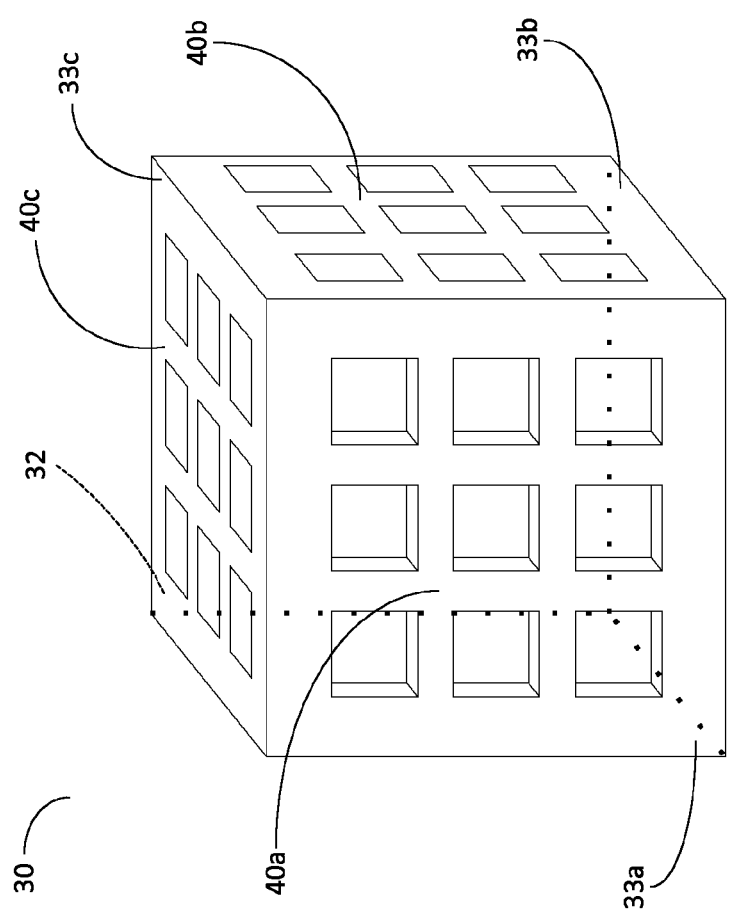
FIG. 2 is an exemplary precision energy adapter (PEA).

FIG. 2 is an exemplary embodiment of a precision energy adapter (PEA) 30. In the exemplary embodiment shown, PEA 30 is a six-sided housing with a single space vehicle component engaging side 32 (not shown) and five sides 33a, 33b, 33c, (33d, 33e not shown) configured with PERs 40a, 40b, 40c. In further exemplary embodiments, PEA 30 may contain additional surfaces configured with PERs, or some surfaces may not contain a PER.

As illustrated in FIG. 2, PERs 40a, 40b, 40c have a 9-aperture receiving surface with receiving software housed in PEA 30.

In the exemplary embodiment shown in FIG. 2, PEA 30 is structured to engage a ground umbilical carrier plate (GUCP) and provide a path for electric power to be distributed to a space vehicle's electrical power system (EPS). On most space vehicles, the GUCP is located at the end of the gaseous hydrogen vent arm on the fixed service structure and is attached to the external tank. The GUCP is therefore one of many critical connections between a space shuttle and a launch pad.

In further exemplary embodiments, PEAs 30 may be connected to any external surface of a space vehicle component. In still further exemplary embodiments, PEAs 30 may be permanent components of space vehicles and space vehicle components, which eliminates the need for electrical and communication umbilicals on the launch pad. Integrated PEAs 30 as a permanent component of space vehicles also allows PAAIS 100 to be available for in-space operations.

PEA 30 also contains internal software components configured to convert thermal energy received from PEEs 25a-25c (not shown) to electric power to be used by a space vehicle. By providing focused, elevated sources of energy through PEAs 30, it is also possible to reduce or eliminate electrical wires and associated insulation in space vehicles (as well as terrestrial vehicles such as cars, airlines and ships), facilities and the national power grid. The resulting mass reduction allows for larger payload mass or up-mass. It would also make the national power grid less susceptible to damage and allow for quicker and cheaper failure analysis by eliminating guess work of failure locations and reducing time to replace damaged components.

Figure 3:
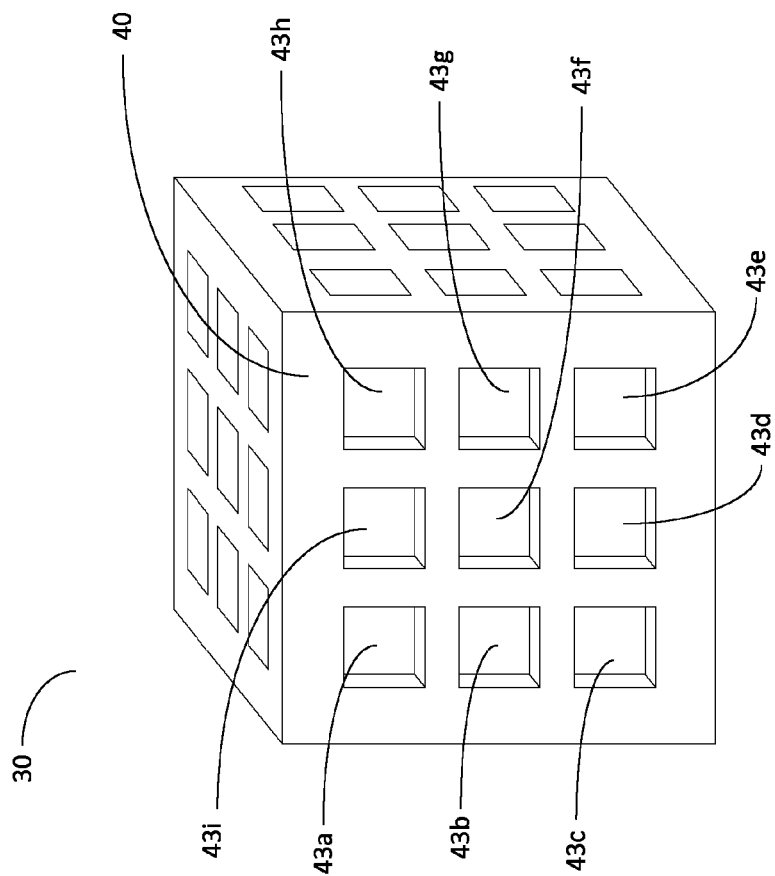
FIG. 3 is an exemplary precision energy receiver (PER).

FIG. 3 is an exemplary embodiment of PER 40 illustrating 9-aperture receiving surfaces. Each receiving aperture 43a, 43b, 43c, 43d, 43e, 43f, 43g, 43h, 43i is connected to PEA 30, which is configured with software to determine which receiving aperture 43a, 43b, 43c, 43d, 43e, 43f, 43g, 43h, 43i is receiving energy.

In some exemplary embodiments, PEA 30 may be configured with software to communicate with a computer system or other processing components. A computer system or other processing components communicate with ground support apparatuses, PEEs, or both to ultimately adjust the position of a space vehicle component.

For example, when no PER 40 is receiving energy, PEA 30 (not shown) may communicate with PAAIS 100 (not shown) that no energy is being received, and any ground support apparatuses will continue moving a space vehicle component. Once a PER 40 is receiving energy, PEA 30 may communicate with PAAIS 100 (not shown) that energy is being received, which PER 40 is receiving it, specifically which receiving aperture or apertures 43 of PER 40 are receiving, and the intensity of the energy being received by the PERs 40. Once a designated receiving aperture 43 (usually the centermost receiving aperture) is receiving the greatest energy input, PEA 30 communicates with PAAIS 100 (not shown) that the space vehicle has reached its pre-determined position in that specific dimension, and ground support apparatuses stop movement in that dimension.

In the exemplary embodiment shown, components of the PAAIS 100 (not shown) are configured to communicate wirelessly with each other. For example, a computer system or other processing component is able to wirelessly receive input from and transmit output information to ground support apparatuses, PEEs and PEAs. In other exemplary embodiments, components of PAAIS 100 (not shown) may communicate through any means known in the art, including wired communications.

Figure 4A:
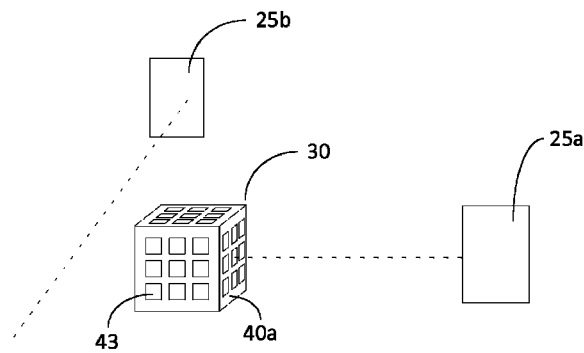
FIGS. 4a and 4b illustrate an exemplary PER receiving energy from a precision energy emitter (PEE).
Figure 4B:
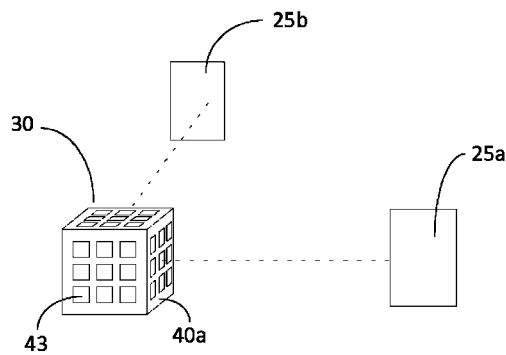

FIGS. 4a and 4b illustrate an exemplary PEA 30 receiving energy from a PEEs 25a, 25b. In the exemplary embodiment shown, PEA 30 contains PERs 40a, 40b (40b not shown on rear side), each with receiving apertures 43.

In FIG. 4a, PER 40a is aligned with energy transmitted from PEE 25a, but is not aligned with PEE 25b, and is therefore not receiving energy at PER 40b. PEA 30 transmits feedback to PAAIS 100 (not shown) indicating that PER 40a is receiving energy, at receiving aperture 43, and that no other energy is being received. In response, PAAIS 100 (not shown) reorients the space vehicle component (not shown) to which PEA 30 is attached.

In the exemplary embodiment shown, because PER 40a is receiving energy from PEE 25a, feedback provided by PEA 30 indicates to PEE 25a to switch from emitting low-power laser energy to emitting high-power laser energy. PEE 25b continues to emit low-power laser energy.

FIG. 4b illustrates PEA 30 in alignment with both PEEs 25a, 25b after it is reoriented based on feedback from PEA 30. As illustrated, PERs 40a, 40b (not shown) are now receiving energy at the designated receiving apertures 43, indicating that the space vehicle component has reached the desired position. Feedback to PAAIS 100 (not shown) provided by PEA 30 halts any movement of the space vehicle component.

FIGS. 5a-5c illustrate an exemplary alignment of space vehicle components 62a, 62b. As illustrated in FIG. 5a, space vehicle component 62a is not in alignment, as PEA 30a is not receiving energy from PEE 25b, although it is receiving energy from PEE 25a.

Based on feedback provided by PEA 30a, space vehicle component 62a is moved until space vehicle component 30a is vertically and horizontally aligned with PEEs 25a, 25b, as illustrated in FIG. 5b.

Once space vehicle component 62a is properly aligned, space vehicle component 62b is transported into assembly area. In the exemplary embodiment shown in FIG. 5c, space vehicle component 62b must be positioned directly above space vehicle component 62a for proper assembly. PAAIS 100 (not shown) therefore continues to move space vehicle component 62b until it receives energy from PEEs 25a, 25b.

As illustrated in FIG. 5c, PEE 25a has been repositioned to take into account the desired vertical position of space vehicle component 62b. PEA 30a on space vehicle component 62a therefore receives no energy from PEE 25a. It also receives no energy from PEE 25b, as space vehicle component 62b blocks that energy. PEA 30b on space vehicle component 62b receives energy from both PEE 25a and 25b.

As additional space vehicle components are assembled, PEEs 25a, 25b, are repositioned, and PAAIS 100 (not shown) continuously receives feedback from all PEAs 30 on space vehicle components.

In further exemplary embodiments, additional PEEs and PEAs may be used to more accurately position space vehicle components. In further exemplary embodiments, multiple PEEs may be used so that PEEs remain in position during the entire assembly process.

Figure 6A:
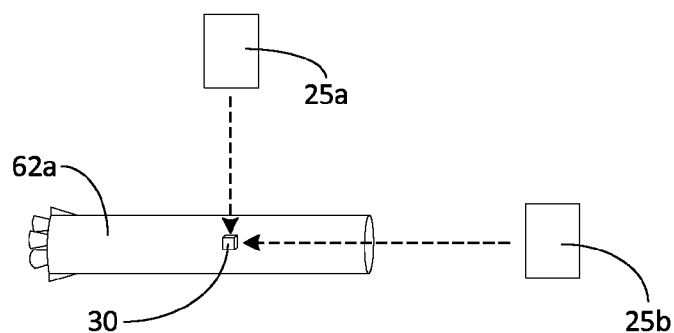
FIGS. 6a, 6b and 6c illustrate an exemplary positioning technique using PAAIS.
Figure 6B:
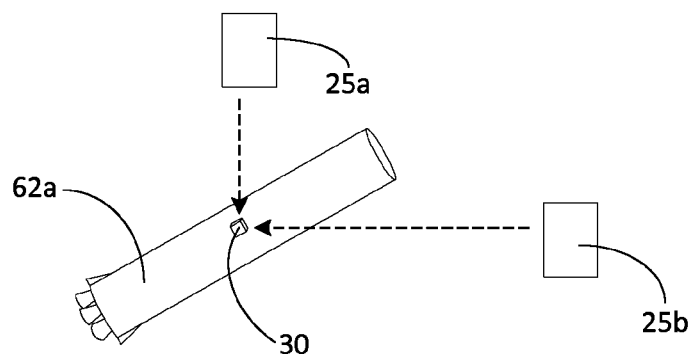
Figure 6C:
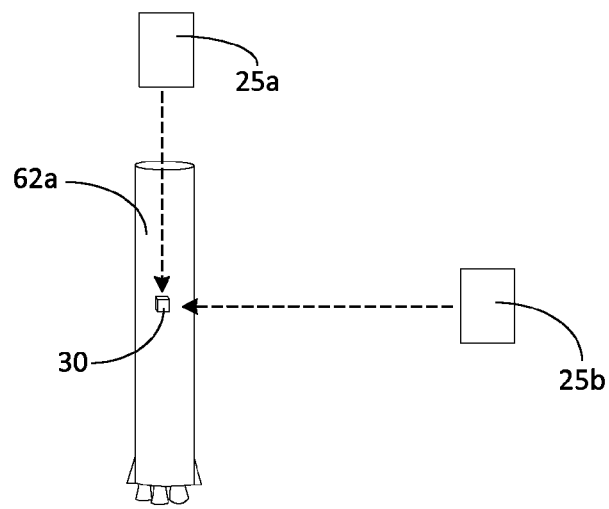

FIGS. 6a-6c illustrate an exemplary positioning of space vehicle component 62a, as space vehicle component 62a is rotated from a horizontal to a vertical position. In FIG. 6a, space vehicle component 62a is in a horizontal position, with PEA 30 receiving energy from PEEs 25a, 25b. However, feedback provided from PEA 30 to PAAIS 100 (not shown) indicates that PERs (not shown) are not receiving energy from the desired PEEs 25a, 25b. PAAIS 100 (not shown) therefore begins to rotate space vehicle component 62a to align PERs (not shown) with the proper PEEs 25a, 25b.

In FIG. 6b, space vehicle component 62a is in transition, with PEA 30 receiving no energy from any PEE 25a, 25b. Feedback providing by PEA 30 tells PAAIS 100 (not shown) to continue to pivot space vehicle component 62a.

In FIG. 6c, space vehicle component 62a is once again aligned with PEEs 25a, 25b, with PERs (not shown) receiving energy from the proper PEEs 25a, 25b. PEA 30 provides feedback to PAAIS 100 (not shown), indicating which PERs (not shown) are receiving energy from which PEE 25a, 25b, and PAAIS 100 (not shown) determines that space vehicle component 62a is properly positioned and halts further movement of space vehicle component 62a.

What is claimed is:

1. A Partial Automated Alignment and Integration System (PAAIS) comprised of:
    at least one horizontally movable equipment component;
    at least one vertically movable equipment component;
    a track assembly comprised of
        a plurality of transportation beams, and
        a plurality of energy-emitting components movably attached to said transportation beams, wherein at least one of said energy-emitting components is positioned to emit energy along a first axis, wherein at least one of said energy-emitting components is positioned to emit energy along a second axis, wherein at least one of said energy-emitting components is positioned to emit energy along a third axis, wherein said first, second, and third axes intersect at a predetermined end-position and end-orientation of a space vehicle component;
    at least one energy-receiving component comprised of
        a six-sided housing, wherein one side is configured to engage an external surface of said space vehicle component and provide a path for electrical power to enter an electrical power system of said space vehicle component,
        a plurality of energy-receiving surfaces fixedly attached to at least one of said housing sides and configured to receive energy emitted by said energy-emitting components, wherein at least one of plurality of energy-receiving surfaces is oriented to receive energy along said first axis when said space vehicle component is in a first position and a first orientation, wherein at least one of plurality of energy-receiving surfaces is oriented to receive energy along said second axis when said space vehicle component is in a second position and a second orientation, wherein at least one of plurality of energy-receiving surfaces is oriented to receive energy along said third axis when said space vehicle component is in a third position and a third orientation;
    at least one communication hardware component; and
    at least one hardware processing component.

2. The system of claim 1 wherein said energy-receiving surface contains nine sub-surfaces.

3. The system of claim 1 wherein said energy-receiving component is configured with software to communicate with said hardware processing component.

4. The system of claim 1 wherein said one side of said six-sided housing configured to engage a space vehicle component engages said space vehicle component at a ground umbilical carrier plate.

5. The system of claim 1 wherein said hardware processing component is configured with software to move said energy-emitting components on said transportation beams.

6. The system of claim 1 wherein said at least one energy-receiving component is configured to convert thermal energy to electrical energy.

7. The system of claim 1 wherein said at least one energy-receiving component is configured to provide continual feedback to said at least one processing component.

8. The system of claim 1 wherein said energy-emitting components contain a high-power laser energy source and a low-power laser energy source.

9. The system of claim 1 wherein at least one of said energy-emitting components emits energy along an x axis, at least one of said energy-emitting components emits energy along a y axis, and at least one of said energy-emitting components emits energy along a z axis.

10. The system of claim 1 wherein said horizontally movable equipment component is configured to move said space vehicle component along an axis selected from the group consisting of an x-axis, a y-axis and combinations thereof.

11. The system of claim 10 wherein said movement is automated.

12. The system of claim 1 wherein said vertically movable equipment component is configured to move said space vehicle component along a z-axis.

13. The system of claim 12 wherein said movement is automated.

14. A computer system-implemented method for aligning a space vehicle component comprising the steps of:
    engaging an external surface of said space vehicle component with at least one energy-receiving component comprised of a six-sided housing, wherein at least one of said sides is configured to engage said external surface and provide a path for electrical power to enter an electrical power system of said space vehicle component and wherein a plurality of energy-receiving surfaces are fixedly attached to at least one of said sides,
    receiving input relating to positions of at least three energy-emitting components;
    adjustably positioning said at least three energy-emitting components along a plurality of transportation beams so that axes of emitted energy from each of said energy-emitting components intersect at a target location corresponding to a predetermined end-position and end-orientation of said space vehicle component;
    emitting energy from said energy-emitting components;
    moving said space vehicle component operatively connected to said at least one energy-receiving component with at least one horizontally vertically movable equipment component and at least one vertically movable equipment component until said energy-receiving component receives said emitted energy, wherein said energy-receiving component engages an external surface of said space vehicle component and provides a path for electrical power to enter an electrical power system of said space vehicle component;
    converting said emitted energy into electrical energy;
    feeding said electrical energy into an electrical power system of said space vehicle component,
    sending a signal to a feedback processor using said electrical energy to communicate an exact position of said space vehicle component;
    readjusting said position of said space vehicle component based on feedback from said feedback processor;

continuously providing a signal to said feedback processor to communicate said exact position of said space vehicle component to create a feedback loop;

ending said feedback loop when said space vehicle component reaches said target location.

15. The method of claim 14 wherein said energy-receiving component contains at least one energy-receiving surface.

16. The method of claim 15 wherein said energy-receiving surface contains 9 sub-surfaces.

17. The method of claim 16 which further includes the step of determining which of said 9 sub-surfaces is receiving said emitted energy.

18. The method of claim 14 wherein said energy-emitting components emit low-power laser energy to be received by said at least one energy-receiving component.

19. The method of claim 18 which further includes the step of emitting high-power laser energy upon feedback from said energy-receiving component indicating that said energy-receiving component is receiving said emitted energy.

20. The method of claim 14 which further includes the step of repeating said method with further space vehicle components.

* * * * *